United States Patent Office 2,986,445
Patented May 30, 1961

2,986,445

TREATMENT OF WOOL WITH ACID ANHYDRIDES IN THE PRESENCE OF DIMETHYLFORMAMIDE

Nathan H. Koenig, El Cerrito, Calif., assignor to the United States of America as represented by the Secretary of Agriculture No Drawing. Filed Jan. 6, 1960, Ser. No. 915

12 Claims. (Cl. 8—128)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates broadly to the chemical modification of wool by reacting it with an organic acid anhydride. In particular, the invention concerns and has as its prime object the provision of processes wherein the reaction of wool with organic acid anhydrides is conducted in the presence of N,N-dimethylformamide, hereafter referred to as dimethylformamide. Further objects and advantages of the invention will be apparent from the following description wherein parts and percentages are by weight, unless otherwise specified.

Prior to this invention it has been advocated that wool be modified by applying an acid anhydride to the wool followed by baking the treated wool in an oven. In another technique, the wool is heated with a solution of acid anhydride in an organic solvent such as benzene or carbon tetrachloride. Under these conditions only a minor amount of acid anhydride actually reacts with the wool so that the degree of modification is low.

In accordance with the present invention, wool is reacted, under essentially anhydrous conditions, with an acid anhydride of the class consisting of aliphatic, aromatic, and aromatic-aliphatic acid anhydrides, in the presence of dimethylformamide, at a temperature of about from 25° to 135° C. until the wool combines with about from 1 to 35% of its weight of the acid anhydride. The dimethylformamide acts as a reaction promoter and promotes actual chemical combination of the wool and the acid anhydride reactant. As a consequence one is enabled to readily prepare wools containing substantial proportions of combined acid anhydride with correspondingly improved properties. Prior hereto, tertiary amines such as pyridine have been employed as promoters in reacting acid anhydrides with compounds containing active hydrogen atoms, i.e., primary amines, alcohols, phenols, etc. It has now been established that dimethylformamide is at least as active as pyridine in promoting reaction between wool and acid anhydrides. Moreover, dimethylformamide is effective in lesser proportion than pyridine, is cheaper than pyridine, and has a mild odor in contrast to the offensive odor of pyridine. Also, dimethylformamide involves a lesser toxicity problem than pyridine and less fire hazard because of a lower order of vapor pressure. Further, the high boiling point of dimethylformamide (153° C.) makes it possible to conduct the wool-acid anhydride reaction at higher temperatures without requiring pressure-tight vessels or other special apparatus. All of these items indicate that dimethylformamide is a very useful promoter for the reaction in question and one which involves many advantages over agents previously described.

The unusual and effective action of dimethylformamide as a promoter for the reaction of acid anhydrides with wool is exemplified by the following comparative tests: (a) Dry wool (1.2 g.) and dodecenylsuccinic anhydride (5 ml.) were heated for 1½ hours at 105° C. The wool was extracted with acetone and ethanol to remove unreacted reagents and dried. It was found that the uptake of acid anhydride by the wool was only 1%; (b) Dry wool (1.2 g.) was heated with dodecenylsuccinic anhydride (1 ml.) and dimethylformamide (4 ml.) at 105° C. for 1½ hours. The wool was extracted as described above and dried. In this case, the uptake of acid anhydride was 19%.

The fact that dimethylformamide acts as a reaction promoter rather than a mere solvent is demonstrated by the following experimental data: Dry wool (1.2 g.) dodecenylsuccinic anhydride (2 ml.), and dimethylformamide (4 ml.) were heated for one hour at 105° C. The wool was extracted with acetone and ethanol to remove unreacted reagents and dried. It was found that the increase in weight of the wool, due to reaction with the anhydride, was 24%. A series of experiments were then carried out under the same conditions but substituting for the dimethylformamide the same volume of the following solvents: butyl acetate, butyl ether, butyl phosphate, chlorobenzene, methylisobutyl ketone, and xylene. In these runs, the uptake of acid anhydride by the wool was only 0 to 1%.

Carrying out the process of the invention essentially involves contacting wool with an acid anhydride in the presence of dimethylformamide. The reaction conditions such as proportion of reagents, specific acid anhydride used, time, temperature, etc., are not critical but may be varied to suit individual circumstances without changing the basic nature of the invention. The proportion of dimethylformamide may be varied widely and may be as low as 0.2 volume per volume of acid anhydride. In the case of acid anhydrides which are normally solid, the volume considered is that of the molten (liquefied) compound. Usually, it is preferred to use a larger proportion of dimethylformamide, i.e., about 1 to 5 volumes thereof per volume of acid anhydride, to attain an increased reaction promoting effect. The temperature of reaction may be about from 25° to 135° C. The reaction rate is increased with increasing temperature and a preferred temperature range to expedite the reaction without possibility of damage to the wool is 100–120° C. The effect of temperature on the rate of reaction is illustrated by the following: In a series of runs, dodecenylsuccinic anhydride (2 ml.) was reacted with dry wool (1.2 g.) in the presence of dimethylformamide (4 ml.) under varying conditions of time and temperature. Uptakes of acid anhydride obtained under these conditions were as follows:

| Reaction conditions | Uptake of acid anhydride on wool, percent |
|---|---|
| 25° C.—72 hours | 11 |
| 60° C.—2 hours | 18 |
| 105° C.—1 hour | 24 |
| 125° C.—½ hour | 26 |

Conventional inert solvents such as chlorobenzene, toluene, or butyl ether may be added to the reaction system, but they generally reduce the reaction rate. The use of a solvent is especially indicated where the acid anhydride used is a solid and the proportion of dimethylformamide is not sufficient to dissolve the acid anhydride. It is preferred to carry out the reaction under anhydrous conditions thereby to ensure reaction between the wool and the acid anhydride and to suppress the formation of insoluble byproducts as mere coatings on the wool. The reaction can be applied to wool in its normal undried condition (containing about 12–14% water) but in such case, the chemical reaction between wool and acid anhydride may be accompanied by formation of insoluble reaction products which deposit on the wool fibers. The degree of modification of the wool is related to the proportion of acid anhydride taken up by the fiber, that is, the higher the uptake of acid anhydride the greater will be the modification of the wool. In general, the uptake of acid anhydride may be varied about from 1 to 35% by weight. In conducting the reaction, the acid anhydride is generally employed in excess over the amount desired to be taken up by the fiber. The time of reaction will vary depending on the proportion of dimethylformamide, temperature of reaction, reactivity of the acid anhydride selected, and the degree of modification desired. In general, the reaction may take anywhere from a few minutes to several hours.

The process in accordance with the invention may be carried out in various ways. For example, the wool may be directly contacted with the dimethylformamide and acid anhydride reactant and the reaction mixture preferably heated as indicated above to cause the acid anhydride to react with the wool. In the alternative, the wool may be pretreated with dimethylformamide and the acid anhydride then added to the mixture and the reaction carried out as previously described. The pretreatment may be carried out at normal temperature or with application of heat, i.e., at 25–135° C.

After reaction of the wool with the acid anhydride, the chemically modified wool is preferably treated to remove excess acid anhydride, dimethylformamide, and solvent, if such as used. Thus, the wool may be treated as by wringing, passage through squeeze-rolls, centrifugation, or the like to remove the excess materials. In place of such mechanical action, or following it, the product may be extracted with an inert volatile solvent such as trichloroethylene, benzene, acetone, carbon tetrachloride, alcohol, etc. Successive extractions with different solvents may be used to ensure complete removal of all unreacted materials.

By treating wool with acid anhydrides as herein described, the wool is chemically modified because there is a chemical reaction between the acid anhydride and the protein molecules of the wool fibers. As a result the modified wool exhibits many advantageous properties over normal wool. Several of these items are explained below:

An advantageous feature of the invention is the increased resistance of the modified wool to acids as indicated by its decreased solubility in hot hydrochloric acid. This factor enables the modified wool to be useful in applications where the product comes into contact with acidic materials. For example, wool may encounter acid conditions during manufacture processes such as carbonizing to remove burrs; dyeing in acid dye baths; and fulling with acid media. The more resistant the wool is to such acid environments, the greater will be its subsequent mechanical strength and wear resistance.

The modified wool is more resistant to oxidizing conditions. Such conditions may be encountered in textile mills during bleaching or other finishing processes and also in use by the action of light and air. The increased resistance to oxidizing conditions is illustrated by the lowered solubility of the modified wool in the peracetic acid-ammonia test described herein below.

The tendency of wool to shrink when subjected to washing in aqueous media has long been a deterrent to the more widespread use of wool. An important advantage of the invention is that it yields modified wools which have a decreased tendency to shrink when subjected to washing with conventional soap and water or detergent and water formulations.

Another advantage is that the modified wool displays increased resistance to yellowing. Thus where wool is originally prepared by scouring and other conventional cleaning methods from the raw fleece, it is essentially white in color. However, upon aging, the wool does not retain its whiteness but becomes more and more yellow. This color change is of course undesirable and restricts the use of wool mainly to applications wherein it is used in a dyed condition. It is believed that the yellowing of wool is caused at least in part by the action of light—the light in some way causing or accelerating chemical changes which give rise to colored compounds. However, it has been found that when wool is treated in accordance with the invention, the tendency of the fiber to turn yellow is greatly diminished.

Although the properties of the modified wool indicate beyond question that actual chemical combination between the wool and the acid anhydride has taken place, it is not known for certain how the wool and acid anhydride moieties are joined. It is believed, however, that the acid anhydride reacts with some of the sites on the wool molecule where there are reactive hydrogen atoms, e.g., amino, guanidino, hydroxyl, and phenolic groups. When the reaction is carried out with polybasic acid anhydrides for example, pyromellitic dianhydride, combination with the wool may establish cross-links between protein molecules of the wool that further increase the resistance of the fibers to chemical attack. It is to be particularly noted that the reaction in accordance with the invention does not impair the wool fiber for its intended purpose, that is, for producing woven or knitted textiles, garments, etc. Moreover, at low and moderate acid anhydride uptakes, the chemical resistance of wool can be considerably improved without appreciably adversely affecting the tensile strength, hand or color of the wool.

The process of the invention may be applied to wool in the form of fibers, as such, or in the form of threads, yarns, slivers, rovings, knitted or woven goods, felts, etc. The wool textiles may be white or dyed goods and may be of all-wool composition or blends of wool with other textile fibers such as cotton, regenerated cellulose, viscose, animal hair, etc.

The invention is of particular advantage in reacting wool with acid anhydrides of higher molecular weight— that is, those with more than eight carbon atoms. Such anhydrides are notorious for their inability to react with wool when using known procedures. However, by applying the process disclosed herein such anhydrides can be caused to react readily with wool.

Although the invention is particularly adapted for reacting wool with acid anhydrides containing more than eight carbon atoms, the reaction-promoting ability of dimethyl formamide is not restricted to any particular acid anhydride or class of acid anhydrides. Consequently, the invention may be applied in the reaction of wool with all types of organic acid anhydrides. Particularly preferred are the aliphatic, aromatic, and aromatic-aliphatic compounds containing one or more of the characteristic anhydride linkages, that is, the group

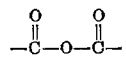

The anhydrides may be hydrocarbon acid anhydrides or may contain substituents on the hydrocarbon residues such as halogen (chlorine, bromine, iodine, or fluorine), ether groups, ester groups, nitro groups, carboxy groups, etc. Examples of compounds coming within the purview of the invention are listed below by way of illustration and not limitation:

Typical examples of compounds in the category of aliphatic acid anhydrides are acetic anhydride, propionic anhydride, butyric anhydride, valeric anhydride, isovaleric anhydride, trimethylacetic anhydride, caproic anhydride, caprylic anhydride, capric anhydride, lauric anhydride, myristic anhydride, palmitic anhydride, stearic anhydride, arachidic anhydride, crotonic anhydride, angelic anhydride, oleic anhydride, elaidic anhydride, linoleic anhydride, linolenic anhydride, maleic anhydride, fumaric anhydride, succinic anhydride, glutaric anhydride, adipic anhydride, pimelic anhydride, suberic anhydride, azelaic anhydride, sebacic anhydride, heptylsuccinic anhydride, octylsuccinic anhydride, decylsuccinic anhydride, dodecylsuccinic anhydride, heptenylsuccinic anhydride, octenylsuccinic anhydride, dodecenylsuccinic anhydride, octadecenylsuccinic anhydride, tricosenylsuccinic anhydride, pentatriacontenylsuccinic anhydride, chloroacetic anhydride, bromoacetic anhydride, iodoacetic anhydride, fluoroacetic anhydride, 9,10-dichloro-octadecanoic anhydride, ethoxyacetic anhydride, carbethoxyacetic anhydride, $\alpha,\beta$-dichlorosuccinic anhydride, cyclohexane-carboxylic anhydride, etc. Of the aliphatic acid anhydrides, it is preferred to use the anhydrides which contain at least eight carbon atoms.

These compounds are preferred as they confer on the treated wool especially desirable properties including resistance to acids, oxidizing agents, and shrinkage.

Typical examples in the category of aromatic acid anhydrides are benzoic anhydride, ortho-toluic anhydride, meta-toluic anhydride, para-toluic anhydride, napthoic anhydride, dodecylbenzoic anhydride, orthochlorobenzoic anhydride, meta chlorobenzoic anhydride, parachlorobenzoic anhydride, 2,4-dichlorobenzoic anhydride, nitrobenzoic anhydride, phthalic anhydride, isophthalic anhydride, terephthalic anhydride, tetrachlorophthalic anhydride, pyromellitic dianhydride, etc.

Typical examples in the category of aromatic-aliphatic anhydrides are phenylacetic anhydride, chlorophenylacetic anhydride, $\beta$-phenylpropionic anhydride, phenoxyacetic anhydride, etc.

Any of the mixed anhydrides may be employed, for example, acetic-lauric anhydride, acetic-stearic anhydride, acetic-oleic anhydride, propionic-palmitic anhydride, acetic-butyric anhydride, acetic-benzoic anhydride, benzoic-stearic anhydride, acetic-napthenic anhydride, diacetic-succinic anhydride, di-acetic-dodecenylsuccinic anhydride, etc.

The invention is further demonstrated by the following illustrative examples—

Example I

A 0.5 gram sample of scoured, dry Lincoln wool was heated with a solution of 6 ml. of heptenylsuccinic anhydride in 12 ml. of dimethylformamide for 90 minutes at 105° C. In order to remove unreacted reagents, the treated wool was extracted three times with hot benzene and then four times with hot chloroform. The extracted product was dried and weighed; the uptake of heptenylsuccinic anhydride by the wool was 28%.

Example II

A sample of dry mohair was treated under the same conditions as in Example I. The treated mohair was extracted a few times, first with warm methanol and then with warm acetone. The uptake of heptenylsuccinic anhydride by the mohair was 32%.

Example III

A 1.5 gram sample of dry wool cut from a knitted sock was treated with a solution of 5 ml. of heptenylsuccinic anhydride in 10 ml. of dimethylformamide for 90 minutes at 105° C. The treated wool was extracted twice with hot benzene and four times with hot ethanol. The uptake of anhydride was 22%.

Example IV

A solution of 5 ml. of butyric anhydride in 35 ml. of dimethylformamide was heated in a 7 x 12 inch enamel tray for 20 minutes at 105° C. A swatch of dry wool flannel, cut to the size of the tray and weighing 7.4 grams, was added to the solution and heating was continued for 90 minutes. The treated flannel was removed from the tray and extracted twice by rinsing and wringing in warm acetone; it was then extracted with ethanol for 16 hours in a Soxhlet apparatus.

The uptake of butyric anhydride calculated from the gain in weight of the dried sample, was 6.4%. The results of the following analyses of the butyric anhydride-treated sample, compared with untreated wool, show that the wool and butyric anhydride are chemically combined. All values are on a dry wool basis.

|  | Total nitrogen, Percent | Amino nitrogen, Percent |
|---|---|---|
| Untreated wool | 16.7 | 0.34 |
| Treated wool (6.4% uptake) | 15.6 | 0.11 |

Example V

Following the procedure of Example IV, 8.8 grams of dry wool flannel were treated with 10 ml. of dodecenylsuccinic anhydride in 30 ml. of dimethylformamide. The uptake of anhydride was 21.3%, and the following analyses were obtained:

|  | Total nitrogen, Percent | Amino nitrogen, Percent | Total Sulfur, Percent |
|---|---|---|---|
| Untreated wool | 16.7 | 0.34 | 3.4 |
| Treated wool (21.3% uptake) | 13.7 | 0.07 | 2.7 |

Example VI

A solution of 3 ml. of 11-tricosenylsuccinic anhydride in 27 ml. of dimethylformamide was heated for 15 minutes at 105° C. Dry wool flannel (3.8 g.) was added and heating was continued for 60 minutes. The uptake of anhydride, calculated after extracting and drying the treated wool, was 14.6%. Analyses of the treated sample were as follows: total nitrogen, 14.3%; amino nitrogen, 0.07%.

Example VII

Employing the procedure of Example IV, 7.6 grams of dry wool flannel was treated with 5 ml. of dodecenylsuccinic anhydride in 35 ml. of dimethylformamide for 90 minutes at 105° C. The uptake of anhydride was 18%.

Example VIII

A 3.5 gram piece of dry wool flannel was heated with 5 ml. of propionic anhydride and 20 ml. of dimethylformamide for 60 minutes at 105° C. The uptake of anhydride by the wool, after extraction and drying, was 9%.

Example IX

A swatch of dry wool flannel (4.1 grams) was treated with 10 ml. of n-octenylsuccinic anhydride dissolved in 20 ml. of dimethylformamide. The materials were heated for 45 minutes at 105° C., and excess reagents were extracted with acetone and ethanol. The uptake of anhydride was 30%.

Example X

A series of experiments were carried out wherein 1.2-gram swatches of dry wool flannel were reacted with varying amounts of dodecenylsuccinic anhydride and dimethylformamide. The wool and reactants were held at 105° C. for 60 minutes, and the treated wool was extracted and dried. The results are tabulated below.

| Dodecenylsuccinic anhydride, ml. | Dimethylformamide, ml. | Uptake, percent |
|---|---|---|
| 6 | 0 | 0 |
| 3 | 3 | 24 |
| 2 | 4 | 24 |
| 1 | 5 | 24 |

Example XI

A swatch of wool flannel, containing about 12% moisture, weighed 1.1 grams. The swatch was reacted, without drying, with a solution of 3 ml. of n-octenylsuccinic anhydride in 6 ml. of dimethylformamide for 45 minutes at 105° C. The treated wool was extracted with acetone and ethanol, then dried. The uptake of anhydride, based on the final dry weight and a calculated initial dry weight, was 31%.

Example XII

A solution of 2.4 grams of maleic anhydride and 30 ml. of dimethylformamide was heated for 15 minutes at 105° C. A 3.9-gram piece of dry wool flannel was added to the solution, and heating was continued for 35 minutes. The treated wool was extracted as described; the uptake was 12%.

Example XIII

A series of runs were carried out wherein dry wool flannel was reacted with various acid anhydrides in the presence of dimethylformamide. In these runs, the weight of dry wool was 1.2 grams and the temperature of reaction was 105° C. The acid anhydrides used, the volume of reagents, the reaction time, and the uptake of acid anhydrides are tabulated below:

| Acid anhydride used | Volume of acid anhydride, ml. | Volume of dimethylformamide, ml. | Reaction time, min. | Uptake of acid anhydride, percent |
|---|---|---|---|---|
| Acetic | 2 | 3 | 30 | 10 |
| Propionic | 1 | 5 | 30 | 8 |
| Butyric | 1 | 4 | 60 | 9 |
| Chloroacetic | 3 | 3 | 30 | 19 |
| Do | 1 | 5 | 45 | 9 |
| Succinic | 0.5 | 10 | 60 | 14 |
| Do | 1 | 10 | 60 | 16 |
| Heptenylsuccinic | 1 | 5 | 30 | 19 |
| Do | 1 | 5 | 60 | 23 |
| n-Octenylsuccinic | 2 | 4 | 30 | 22 |
| Do | 2 | 4 | 60 | 25 |
| Dodecenylsuccinic | 2 | 4 | 15 | 7 |
| Do | 2 | 4 | 30 | 15 |
| n-Octadecenylsuccinic | 3 | 5 | 60 | 32 |
| Do | 3 | 5 | 120 | 35 |
| 11-Tricosenylsuccinic | 2 | 4 | 60 | 20 |
| Do | 2 | 4 | 120 | 25 |
| 17-Pentatriacontenylsuccinic | 1 | 7 | 90 | 14 |
| Phthalic | 1 | 10 | 15 | 8 |
| Do | 0.5 | 10 | 30 | 15 |
| Tetrachlorophthalic | 1 | 10 | 30 | 10 |

Example XIV

The acid solubility of modified wools produced in accordance with the invention and that of untreated wool were determined in the following way: The wool sample is immersed in 4 N hydrochloric acid for one hour at 65° C. The loss in weight of the sample is then determined after thoroughly washing the acid-soaked wool. The increased resistance of modified wools to hot hydrochloric acid is illustrated by the following data:

| Acid anhydride | Uptake of acid anhydride by wool, percent | Acid solubility, percent |
|---|---|---|
| None (untreated wool) | 0 | 7.2 |
| n-octenylsuccinic anhydride | 24 | 3.1 |
| dodecenylsuccinic anhydride | 21 | 1.1 |
| pentatriacontenylsuccinic anhydride | 18 | 2.7 |

Example XV

Experiments were carried out to determine the resistance of the modified wools to oxidizing conditions by measuring their solubility in peracetic acid-ammonia. In this test, about 0.4 g. of wool is treated for 2 to 4 hours with 100 ml. of 2% peracetic acid and finally for at least 16 hours with 100 ml. of 0.3 N ammonium hydroxide. The loss in weight is determined after thorough washing with water. The percent increase in resistance to peracetic acid-ammonia is calculated from the following formula:

$$\frac{\text{L/O of untreated wool} - \text{L/O of modified wool}}{\text{L/O of modified wool}} \times 100$$

Where: L/O is the loss in weight of the sample of modified (or untreated) wool divided by the original weight of the sample of modified (or untreated) wool.

The results obtained are tabulated below:

| Acid anhydride | Uptake of anhydride, percent | Increased resistance to peracetic acid-ammonia, percent |
|---|---|---|
| Butyric anhydride | 6 | 140 |
| Maleic anhydride | 12 | over 500 |
| n-Octenylsuccinic anhydride | 30 | 150 |
| n-Octadecenylsuccinic anhydride | 32 | 380 |
| 17-Pentatriacontenylsuccinic anhydride | 18 | over 500 |

Example XVI

Tests were carried out to determine the improvement in shrinkage characteristics of the modified wools. The shrinkage tests were carried out as follows: The wool samples were milled at 1700 r.p.m. for 2 minutes at 40–42° C. in an "Accelerotor" with 0.9% sodium oleate solution, using a liquor to wool ratio of 50 to 1. After this washing operation, the samples were measured to determine their area. The improvement in shrinkage properties of wool modified in accordance with the invention is demonstrated by the following data:

| Acid anhydride | Uptake of acid anhydride, percent | Area shrinkage, percent |
|---|---|---|
| None (untreated wool) | 0 | 49 |
| Butyric anhydride | 9 | 23 |
| Heptenylsuccinic anhydride | 23 | 6 |
| Dodecenylsuccinic anhydride | 24 | 6 |
| n-Octadecenylsuccinic anhydride | 35 | 6 |

Example XVII

To measure resistance to yellowing, treated samples and an untreated control were irradiated for 24 hours with a low pressure mercury vapor lamp as a source of ultraviolet rays. As a measure of yellowing, the percent reflectance—i.e., the percentage of light reflected from the samples—was measured with a photometer before and after irradiation. The reflectance values are an index of yellowing: the smaller the proportion of light reflected, the yellower the wool. The value of the treatment is shown by the following data, wherein the percent improvement in resistance to yellowing is calculated from the formula—

$$\left[\frac{IRC - FRC}{IRT - FRT} \times 100\right] - 100$$

where:

IRC = initial percent reflectance of untreated control.
FRC = final percent reflectance of untreated control.
IRT = initial percent reflectance of treated sample.
FRT = final percent reflectance of treated sample.

| Acid anhydride | Uptake, percent | Initial reflectance, percent | Final reflectance, percent | Improvement in resistance to yellowing, percent |
|---|---|---|---|---|
| None (control) | 0 | 56.5 | 37 | 0 |
| Acetic anhydride | 10 | 50.5 | 42.5 | 140 |
| Propionic anhydride | 9 | 47 | 39 | 140 |
| n-Dodecenylsuccinic anhydride | 30 | 48 | 39 | 120 |
| 11-Tricosenylsuccinic anhydride | 24 | 47.5 | 37.5 | 95 |

The various alkenyl succinic anhydrides used in the above examples were commercial products having the type formula

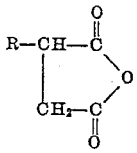

wherein R is an alkenyl radical. More specifically, the radical R in the various compounds is as follows:

Heptenylsuccinic anhydride: R is $C_7H_{13}$— n-Octenylsuccinic anhydride: $R_8$ is $C_8H_{15}$—(straight chain)

Dodecenylsuccinic anhydride: R is $C_{12}H_{23}$— n-Dodecenylsuccinic anhydride: R is $C_{12}H_{23}$—(straight chain)

n-Octadecenylsuccinic anhydride: R is $C_{18}H_{35}$—(straight chain)

11-Tricosenylsuccinic anhydride:

R is $C_{10}H_{21}$—CH=CH—CH—$C_{10}H_{21}$

17-Pentatriacontenylsuccinic anhydride:

R is $C_{16}H_{33}$—CH=CH—CH—$C_{16}H_{33}$

Having thus defined the invention, what is claimed is:

1. A process for chemically modifying wool which comprises reacting wool under essentially anhydrous conditions, in the presence of dimethylformamide, with an acid anhydride of the class consisting of aliphatic, aromatic, and aromatic-aliphatic acid anhydrides, at a temperature about from 25° to 135° C. until the wool combines with about from 1 to 35% of its weight of the acid anhydride.

2. The process of claim 1 wherein the acid anhydride is an aliphatic mono-basic acid anhydride containing at least 8 carbon atoms.

3. The process of claim 1 wherein the acid anhydride is lauric anhydride.

4. The process of claim 1 wherein the acid anhydride is myristic anhydride.

5. The process of claim 1 wherein the acid anhydride is palmitic anhydride.

6. The process of claim 1 wherein the acid anhydride is stearic anhydride.

7. The process of claim 1 wherein the acid anhydride is an alkenylsuccinic anhydride of the formula.

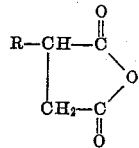

wherein R is an alkenyl radical of at least 7 carbon atoms.

8. The process of claim 7 wherein R is heptenyl.
9. The process of claim 7 wherein R is octenyl.
10. The process of claim 7 wherein R is dodecenyl.
11. The process of claim 7 wherein R is tricosenyl.
12. The process of claim 7 wherein R is pentatriacontenyl.

References Cited in the file of this patent

UNITED STATES PATENTS

| | | |
|---|---|---|
| 1,451,299 | Haynn et al. | Apr. 10, 1923 |
| 1,698,226 | DuBois | Jan. 8, 1929 |
| 2,130,150 | Nathansohn | Sept. 13, 1938 |
| 2,171,791 | Kaase et al. | Sept. 5, 1939 |
| 2,499,653 | Kropa et al. | Mar. 7, 1950 |
| 2,880,054 | Moore | Mar. 31, 1959 |